US012136405B2

(12) United States Patent
Ceccolini et al.

(10) Patent No.: US 12,136,405 B2
(45) Date of Patent: Nov. 5, 2024

(54) DEXTEROUS MUSICAL-INSTRUMENT SPINNER

(71) Applicant: Voda, LLC, Ann Arbor, MI (US)

(72) Inventors: Anthony Robert Ceccolini, Corning, NY (US); Gary Ceccolini, Ann Arbor, MI (US)

(73) Assignee: Voda, LLC, Ann Arbor, MI (US)

( * ) Notice: Subject to any disclaimer, the term of this patent is extended or adjusted under 35 U.S.C. 154(b) by 235 days.

(21) Appl. No.: 17/780,785

(22) PCT Filed: Dec. 2, 2020

(86) PCT No.: PCT/US2020/062767

§ 371 (c)(1),
(2) Date: May 27, 2022

(87) PCT Pub. No.: WO2021/113275

PCT Pub. Date: Jun. 10, 2021

(65) Prior Publication Data

US 2022/0415287 A1 Dec. 29, 2022

Related U.S. Application Data

(60) Provisional application No. 62/942,851, filed on Dec. 3, 2019.

(51) Int. Cl.
*G10D 9/00* (2020.01)
*G10D 7/10* (2006.01)

(52) U.S. Cl.
CPC ................. *G10D 9/00* (2013.01); *G10D 7/10* (2013.01)

(58) Field of Classification Search
None
See application file for complete search history.

(56) References Cited

U.S. PATENT DOCUMENTS 2,792,666 A 5/1957 Green
3,141,369 A 7/1964 Miccio
3,365,108 A 1/1968 Giba
(Continued)

OTHER PUBLICATIONS

U.S. Appl. No. 62/795,682, filed Jan. 23, 2019, Anthony Ceccolini.

*Primary Examiner* — Kimberly R Lockett
(74) *Attorney, Agent, or Firm* — Endurance Law Group PLC

(57) ABSTRACT

A spinner assembly for an instrument having valves and/or slides. A clamp sub-assembly attaches to the instrument while a hand strap sub-assembly encircles a player's conjoined hand. A bearing rotatably connects the clamp sub-assembly to the hand strap sub-assembly about a drive axis (D) that is offset from the natural balance axis of the instrument (X). The clamp sub-assembly includes a mounting plate fashioned with three side-by-side cradles that nest against the horn valves. A lashing holds the cradles in position. The hand strap sub-assembly includes a generally rigid palm plate that fits in the player's palm. The palm plate has a hypothenar end, a web end and a distal edge. The distal edge has a ring finger relief adjacent the hypothenar end. A driver boss is affixed to the backside of the palm plate adjacent the web end. A flexible belt secures the player's hand to the palm plate.

20 Claims, 10 Drawing Sheets

(56) References Cited

U.S. PATENT DOCUMENTS

| | | | | |
|---|---|---|---|---|
| 4,926,735 | A | 5/1990 | Smith | |
| 5,553,529 | A | 9/1996 | Smith | |
| 5,573,158 | A | 11/1996 | Penn | |
| 5,847,300 | A | 12/1998 | Hackl | |
| 6,087,572 | A | 7/2000 | Dillon | |
| 7,173,176 | B2 | 2/2007 | Nybye | |
| 7,351,896 | B2 | 4/2008 | Clifford | |
| 7,396,985 | B1 * | 7/2008 | Roth | G10D 9/00 84/387 A |
| 7,435,889 | B1 | 10/2008 | Heidt | |
| 7,576,276 | B2 | 8/2009 | Hallerberg | |
| 7,615,700 | B2 | 11/2009 | DiClaudio | |
| 7,638,699 | B2 | 12/2009 | Buettgen | |
| 7,888,573 | B1 | 2/2011 | Darbon | |
| 8,227,676 | B2 | 7/2012 | Jackson et al. | |
| 8,637,754 | B2 | 1/2014 | St. George | |
| 2009/0044684 | A1 | 2/2009 | Avartanian | |
| 2012/0006177 | A1 | 1/2012 | Jackson et al. | |
| 2015/0182010 | A1 | 7/2015 | Burns et al. | |
| 2017/0256243 | A1 | 9/2017 | Satterlee | |

* cited by examiner

DEXTEROUS MUSICAL-INSTRUMENT SPINNER

CROSS REFERENCE TO RELATED APPLICATIONS

This application claims priority to Provisional Patent Application 62/942,851 filed on Dec. 3, 2019, the entire disclosure of which is hereby incorporated by reference and relied upon.

BACKGROUND OF THE INVENTION

Field of the Invention. The invention relates generally to musical instrument spinner assembly, and more particularly to a spinner assembly for a wind instrument.

Description of Related Art. Musical performances are a form of performance art. In addition to the musical sound produced for the audience, such performances can often include visual aspects, such as body movements. A marching band performance, for example, is characterized by complex synchronized body movements combined with musical sounds. The visual attributes of a performance can include flamboyant maneuvers of the instrument, such as spinning not unlike that of a baton twirler. Because of the bright reflective qualities of most brass wind instruments, flamboyant maneuvers of trumpets and other horns are a perennial favorite. When the flamboyant maneuver includes spinning the instrument, rotation about or in partnership with its natural balance axis gives the player maximum control and enables the fastest possible rotation. Spinning an instrument is meant to impress and entertain viewers.

According to prior art techniques developed for trumpets and other smaller three-valve brass instruments, a two-handed spinning maneuver is relatively well-known. The two-handed spinning maneuver utilizes the one finger of the player's left hand and one finger of the player's right hand. These fingers are inserted, respectively, through any convenient area of the horn. In the example of a trumpet, it was common to insert one finger in the thumb saddle on the first valve tuning slide and the other finger through the third valve slide ring. To spin the horn, both hands were moved in a circling motion, causing the horn to also spin in a controlled circle. As the name would imply, two-handed spinning maneuvers like this demand that both hands be in contact with the horn so the player can maintain complete control at all times. Unfortunately, not all instruments are fitted with suitable locations in which to insert opposing fingers. And, players frequently wear gloves which can make insertion through small loops and crevasses difficult and/or create unforeseeable frictional effects during rotation.

U.S. Pat. No. 7,396,985 to Roth, issued Jul. 8, 2008, discloses a clip-on spinner device intended to enable the spinning maneuver using a single hand of the player. However, it has been discovered that the teaching of this patent are deficient in several important respect. One, the T-grip style requires the player to dedicate their left hand (i.e., the conjoined hand) to holding the handgrip, such that all mechanical pitch manipulating features can only be actuated by the player's right hand. In effect, the player's left hand becomes entirely decommissioned by its needed grasp on the T-grip handle. The knuckles of the player's constrained hand will point toward the spinning horn, thus inviting a sharp and painful collision. A T-grip style handle is notoriously fatiguing to hold for long periods of time. A player's hand will rapidly become tied and find it progressively more difficult to resist the torque-induced precession of a spinning instrument. Furthermore, the spinner device of U.S. Pat. No. 7,396,985 includes a clutch mechanism which naturally locks the horn against rotation until a release button is depressed. Because the player's conjoined hand is dedicated to grasping the T-grip handle, the clutch mechanism is needed to prevent rotation when holding the instrument with the conjoined hand only. And the player is likely unable, or at least will find it difficult, to initiate rotation of the instrument when holding the instrument with the conjoined hand only.

U.S. Pat. No. 8,227,676 to Jackson et al., issued Jul. 24, 2012, describes a clip-on hand support for a trombone. The open hand-grip enables the player to use their fingers while supporting the weight of the trombone with the same hand. U.S. Pat. Ser. No. 8,227,676 does not appear to teach a spinning interface. Likewise, U.S. Pat. No. 3,141,369 to Micci, issued Jul. 21, 1964, shows another example of grip assisting attachment for a musical instrument. U.S. Pat. No. 3,141,369 does not appear teach a spinning interface.

Despite the attempts of the prior art to provide improved options for musical performers, there remains a need in the art for still further innovations and improvements that are less susceptible to droppage, easier to use, easier to install, can be easily retro-fit to a wide variety of types of horns and other instruments, is low-cost, robust and relatively maintenance free over a long service life.

BRIEF SUMMARY OF THE INVENTION

According to a first aspect of this invention, a musical instrument spinner assembly comprises a clamp sub-assembly configured to attach to a wind instrument. The clamp sub-assembly includes a mounting plate. A lashing is operatively connected to the mounting plate. The clamp sub-assembly includes a stand-off. A drive axis passes through the stand-off. A hand strap sub-assembly is configured to encircle the palmar region of a conjoined hand. A bearing rotatably connects the clamp sub-assembly and the hand strap sub-assembly about the drive axis. The hand strap sub-assembly includes a generally rigid palm plate, and a belt is coupled to the palm plate.

According to a second aspect of this invention, a spinner assembly is provided for a musical instrument of the horn type having first and second and third valve casings arranged in side-by-side parallel relationship to one another. The spinner assembly comprises a clamp sub-assembly configured to attach to the valve casings of the instrument. The clamp sub-assembly includes a mounting plate having a first cradle and a second cradle and a third cradle. A lashing is operatively connected to the mounting plate. The clamp sub-assembly includes a stand-off. A drive axis passes through the stand-off. A hand strap sub-assembly is configured to encircle the palmar region of a player's conjoined hand. A bearing rotatably connects the clamp sub-assembly and the hand strap sub-assembly about the drive axis. The hand strap sub-assembly includes a generally rigid palm plate. The palm plate has a hypothenar end and a web end and a distal edge and a proximal edge. A belt is coupled to the palm plate. A driver boss is affixed to the palm plate. The drive axis passes through the driver boss. The driver boss is located adjacent, or proximate to, the web end and is spaced from, i.e., remote to, the hypothenar end.

According to a third aspect of this invention, a combination musical instrument of the horn type and spinner assembly is provided. The combination comprises a wind instrument having a mouthpiece for air input and a bell for air escape. The wind instrument has optimal rotational balance about a balance axis disposed between the mouthpiece and the bell. A sound tube plenum extends between the mouthpiece and the bell. The sound tube includes a lead pipe section adjoins the mouthpiece, and further includes a first valve casing and a second valve casing and a third valve casing. The first and second and third valve casings are arranged parallel to one another, and generally perpendicular to the lead pipe section. The first valve casing is adjacent the mouthpiece and the third valve casing is adjacent the bell. A first valve stem extends from the first valve casing and is disposed for reciprocating movement therein. A first finger button is affixed to a distal end of the first valve stem. A second valve stem extends from the second valve casing and is disposed for reciprocating movement therein. A second finger button is affixed to a distal end of the second valve stem. A third valve stem extends from the third valve casing and is disposed for reciprocating movement therein. A third finger button is affixed to a distal end of the third valve stem. A clamp sub-assembly is attached to the wind instrument. The clamp sub-assembly includes a mounting plate. The mounting plate includes a first cradle and a second cradle and a third cradle. A lashing is operatively connected to the mounting plate. The lashing presses the first cradle in direct engagement with the first valve casing and the second cradle in direct engagement with the second valve casing and the third cradle in direct engagement with the third valve casing. The lashing is disposed below the lead pipe section of the sound tube. The clamp sub-assembly includes a stand-off. A drive axis passes through the stand-off. A hand strap sub-assembly is configured to encircle the palmar region of a player's conjoined hand. The hand strap sub-assembly includes a generally rigid palm plate. The palm plate has a hypothenar end and a web end and a distal edge and a proximal edge. A driver boss affixed to the palm plate. The drive axis passes through the driver boss. The driver boss is located adjacent the web end and spaced from the hypothenar end. A flexible belt is coupled to the palm plate. A bearing rotatably connects the clamp sub-assembly and the hand strap sub-assembly about the drive axis.

The musical instrument spinner of this invention enables a player to drive rotation of their instrument about its balance axis with one conjoined hand for visual effect, while maintaining full dexterity of the player's conjoined hand to single-handedly start and stop rotation at will, and to enable the same one hand to interact with the instrument as may be needed to vary pitch and/or tone. That is to say, the musical instrument spinner of this present invention advantageously empowers the player's conjoined hand to remain an active and contributing actor in the performance—both visually and audibly. In terms of visually, the spinner enables the conjoined hand to remain open, i.e., with thumb and fingers extended, while the instrument is spinning. The unencumbered thumb and fingers remain poised to spring to action at any instant starting, stopping, slowing, accelerating and/or reversing rotation of the instrument. In addition, the open-handed grip allows the player's conjoined hand to be positioned close to the spinning instrument, thus minimizing torsional imbalances to yield increased rotational speeds and greater control while the instrument is spinning. In terms of audibly, the spinner enables the thumb and fingers of the conjoined hand to remain useful while the instrument is played.

The spinner of this invention is also useful to assist the player in counteracting torque-induced precession. According to the laws of physics, the spinning instrument will tend to pitch and roll. The palm plate effectively distributes the reaction to torque-induced precession, thus enabling the player to maintain the instrument spinning rapidly for prolonged periods without the appearance of torque-induced precession nor the onset of fatigue caused thereby.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1:
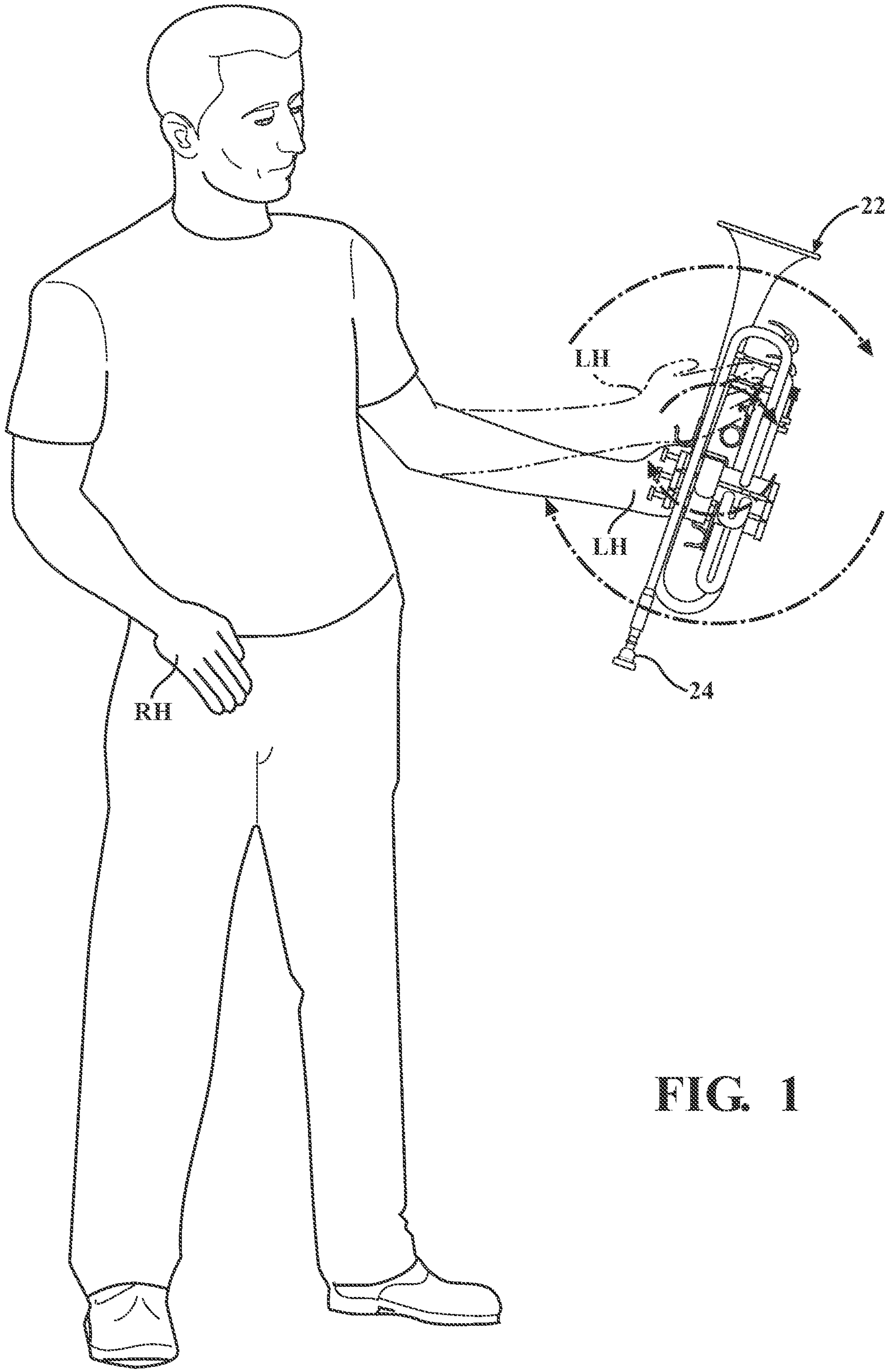
FIG. 1 shows an exemplary performer spinning a trumpet with an open left (conjoined) hand while the right hand is free to perform other motions.

Referring to the figures, wherein like numerals indicate like or corresponding parts throughout the several views, a musical instrument spinner assembly is generally shown at 20. The musical instrument spinner 20 is adapted for use with wind instruments 22, which may be defined as the types of instruments that produce sound by vibrating a column of air by the player blowing into a mouthpiece 24. The column of air travels through a sound tube plenum 26 and exits through a bell 28 or another type of end feature. That is to say, the sound tube 26 extends between the mouthpiece 24 and the bell 28. For the sake of convenience, the term bell 28 is used herein in a general sense to include non-flared examples such as found in flutes and the like. Wind instruments include the so-called brass instruments (horns, trumpets, trombones, etc.) and woodwind instruments (recorders, flutes, oboes, clarinets, saxophones, etc.) As used herein, the term musical instrument is intended to include a wide variety of types of these wind instruments, but in particular those of the smaller sizes capable of being spun using a single hand of the player.

The spinner assembly 20 can be used effectively with any type of wind instrument 22. In the illustrated examples, however, the instrument 22 is shown in the form of a brass horn, and more specifically that of a trumpet. One characteristic of trumpets (as well as coronets, bugles and the like) is that its sound tube 26 includes a generally straight lead pipe section 30 the extends from the mouthpiece 24 in the general direction of the bell 28. From the straight lead pipe 30, the sound tube 26 turns in a distinctive oval pattern looping back toward the mouthpiece 24 before eventually connecting to the bell 28.

Every wind instrument 22 is believed to have an optimal rotational balance about a balance axis X that extends transversely between the mouthpiece 24 and the bell 28. The balance axis X is that imaginary line about which the instrument 22 could be rotated in a tumbling fashion, mouthpiece 24 over bell 28, with the least observable imbalance. One can imagine a taught string passing transversely through the instrument 22 along its balance axis X. The instrument 22 could be rotated on this imaginary string to any angle and hold a set position because the gravitational pull is equally offset on both sides of the string. Of course, the balance axis X can sometimes be difficult to pinpoint with precise accuracy, however an effective approximation of its location is instinctively acquired by most players through feel. A player typically holds the instrument on or near the balance axis X, which gives the player a secure and comfortable hold.

The pitch of the sound produced by the instrument 22 is controlled by modifying the effective length of the vibrating column of air inside the sound tube 26, as typically accomplished by one or more pitch manipulators, and/or by varying the player's embouchure. A bugle, for example, controls pitch control exclusively by varying the player's embouchure. However, most wind instruments 22 include a least one mechanical pitch manipulator along the sound tube 26. Mechanical pitch manipulators can take many different forms. In the simplest case of a recorder style instrument 22, the pitch manipulator is a hole in the sound tube 26 that is selectively covered by the fingertip of the player. In more complex instruments 22 however, the pitch manipulator will include one or more control valves and/or slides operatively interacting with the sound tube 26 at strategic locations. These one or more control valves/slides are actuated by the fingers of the player.

As previously mentioned, the spinner assembly 20 can be used effectively with any type of wind instrument 22, although the form of a trumpet is used herein for exemplary purposes. For the typical trumpet, the pitch manipulator comprises a plurality of both control valves and slides. In particular, the trump includes three poppet-style control valves: a first valve; a second valve; and a third valve. The first valve is identifiable in the figures by a first valve casing 32A; the second valve by a second valve casing 32B; and the third valve by a third valve casing 32C. This characteristic is shared among many types of other types horns having first 32A, second 32B and third 32C valve casings arranged in side-by-side parallel relationship to one another, such as coronets, mellophones, flugelhorns, French horns, tubas, and the like. For convenience, throughout the following description components of the first valve will be distinguished by reference numbers containing the suffix "A," components of the second valve with reference numbers containing the suffix "B," and components of the third valve with reference numbers containing the suffix "C." In common practice the first, second and third valves of a trumpet are actuated by the fingers on the right hand RH of the player (FIG. 1).

The first 32A, second 32B and third 32C valve casings are arranged parallel to one another in a tight stack in the mid-section of the instrument 22, generally perpendicular to the lead pipe 30. The first valve casing 32A is adjacent the mouthpiece 24, whereas the third valve casing 32C is adjacent the bell 28. The second valve casing 32B is sandwiched in-between the first 32A and third 32C valve casings. A first valve stem 34A extends from the first valve casing 32A and is disposed for reciprocating movement therein. A first finger button 36A is affixed to a distal end of the first valve stem 34A. A second valve stem 34B extends from the second valve casing 32B and is disposed for reciprocating movement therein. A second finger button 36B is affixed to a distal end of the second valve stem 34B. A third valve stem 34C extends from the third valve casing 32C and is disposed for reciprocating movement therein. A third finger button 36C is affixed to a distal end of the third valve stem 34C. Springs (not shown) inside each valve casing 32A-C urge their respective valve stems 34A-C to return to the upwardly extended rest position as shown in the accompanying illustrations. In this manner, as a player depresses one of the finger buttons 36A-C, the respective valve stem 34A-C is plunged into its casing 32A-C against the internal spring. When the player lifts their finger from the finger button 36A-C, the associated valve stem 34A-C returns to its extended rest position. By mechanically actuating the valve stems 34A-C in this manner, an accomplished player can cause the instrument to produce pitches corresponding to all of the standard notes of a musical scale within a given range.

The typical trumpet is equipped with additional pitch manipulators in the form of mechanical slides to produce an extended variety of pitch and/or tonal changes. These additional pitch manipulators include a first valve tuning slide 38 and a third valve slide 40. The player can alter the pitch and/or tone of the sound produced by the instrument 22, on the fly, by extending and contracting the first valve tuning slide 38 and/or third valve slide 40.

The first valve tuning slide 38 extends laterally from first valve casing 32A. A thumb saddle 42 is affixed to the first valve tuning slide 38 to be engaged by the thumb 44 of a player's left hand LH. With the left thumb 44, the player moves the first valve tuning slide 38 back and forth to achieve desired sound manipulations.

Figure 4:
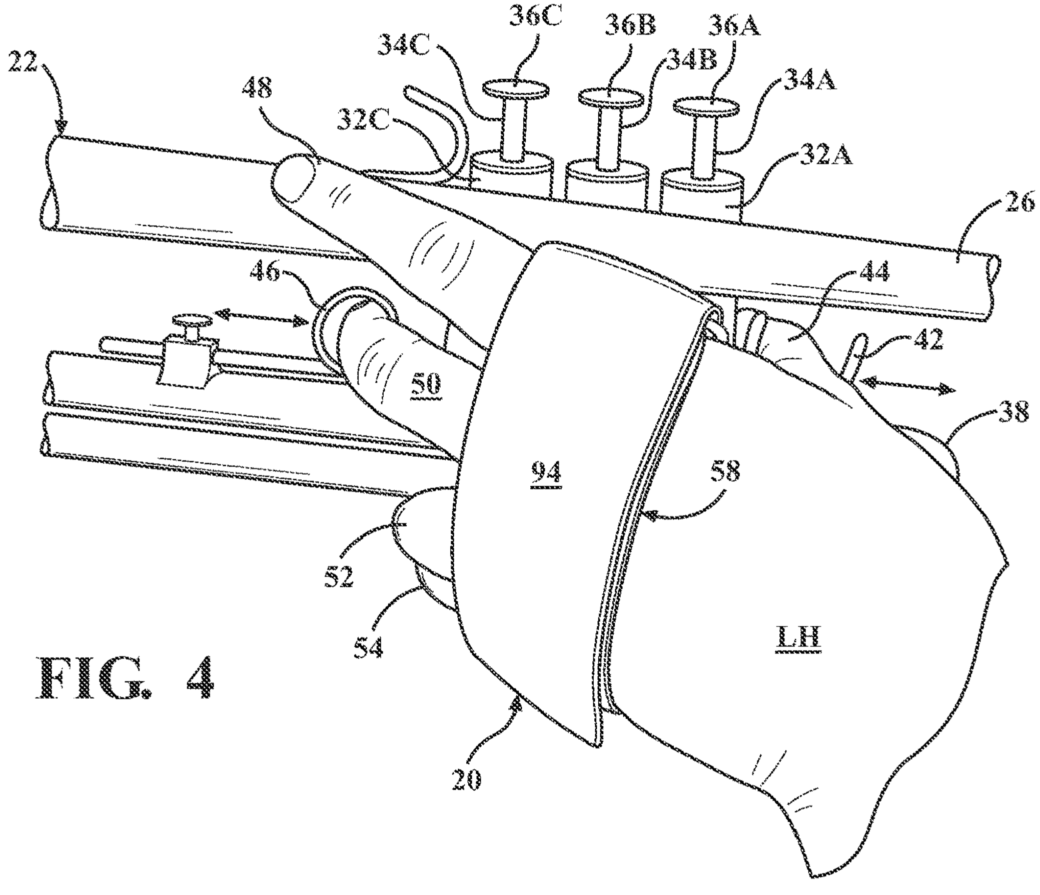
FIG. 4 is a view comparable to FIG. 3 but showing the player holding, with their left (conjoined) hand, a trumpet fitted with a spinner according to this invention.
Figure 5:
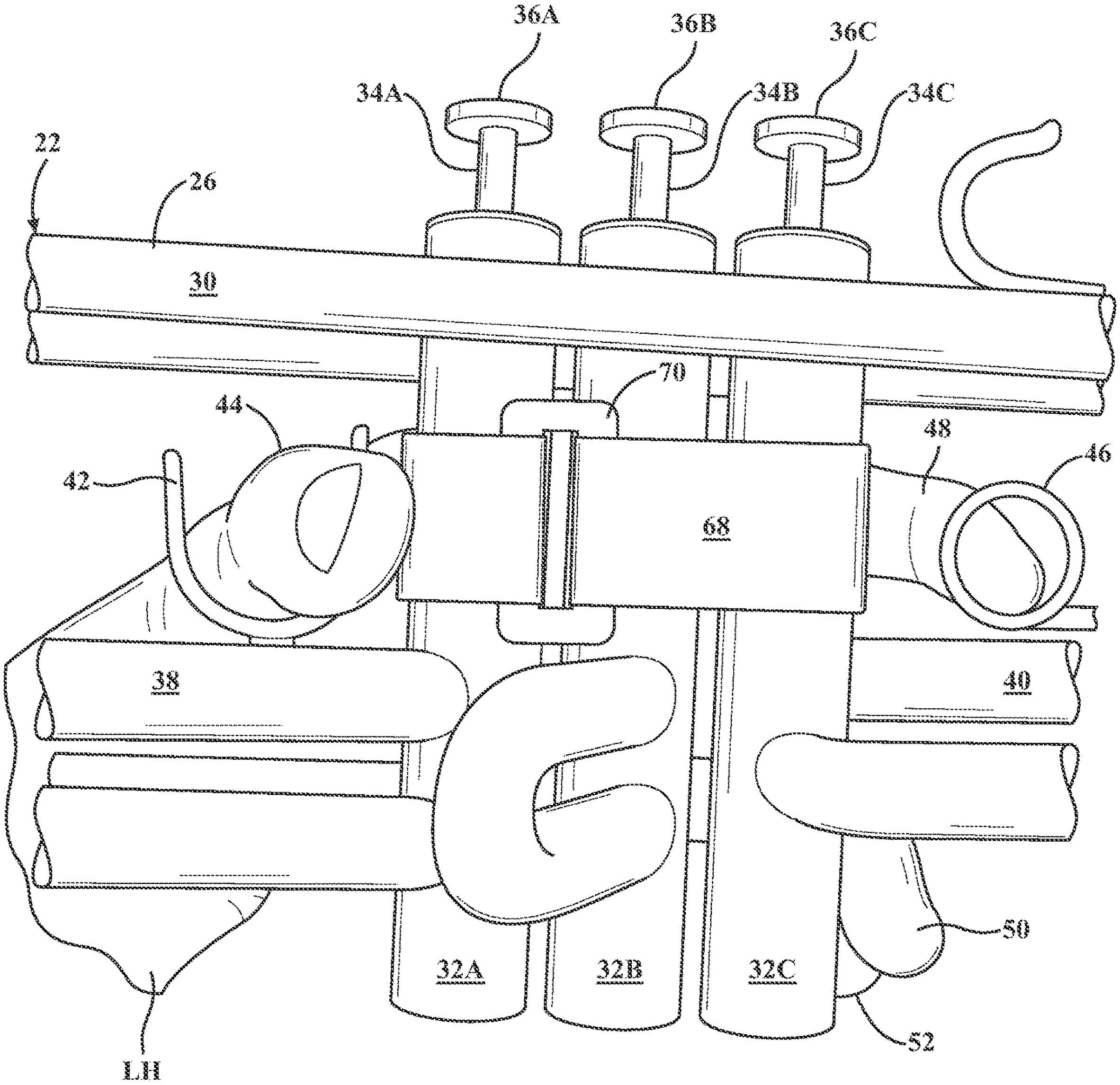
FIG. 5 is a close-up view a trumpet fitted with a spinner, taken from the opposite side perspective from FIG. 4 and with the player's index and ring fingers shown in slightly different positions.
Figure 6:
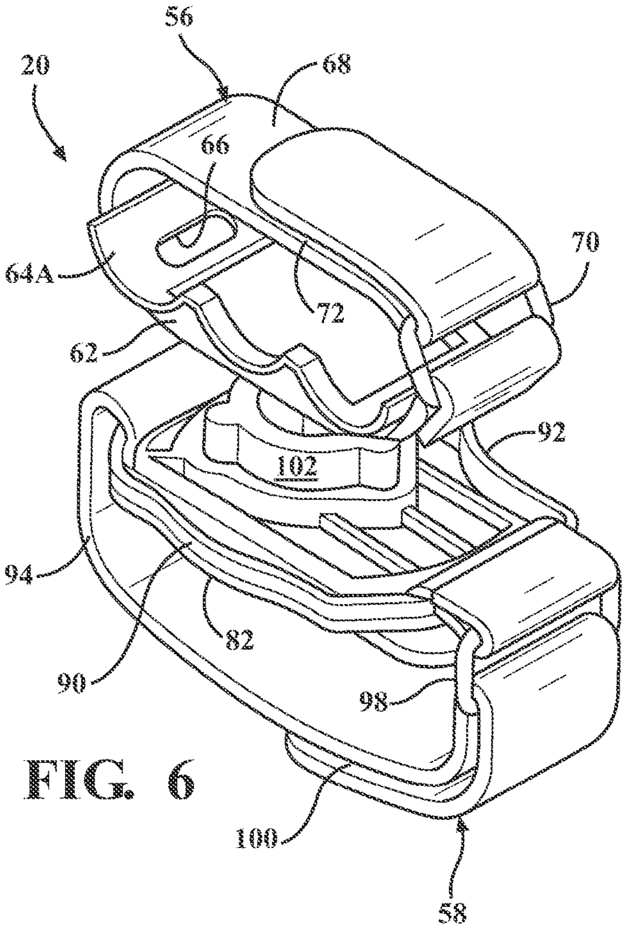
FIG. 6 is a perspective view of the spinner according to an embodiment of this invention.

The third valve slide 40 extends laterally from the third valve casing 32C and includes a third valve slide ring 46 affixed thereto. The third valve slide ring 46 is adapted to receive one of the opposing fingers 48-54 of a player's left hand LH for moving the third valve slide 40 back and forth to achieve desired sound effects. The opposing fingers of the player's left hand LH include the index finger 48, middle finger 50, ring finger 52 and pinky finger 54. Some players at some times will find it most comfortable to insert their middle finger 50 into the third valve slide ring 46, as suggested in FIGS. 3 and 4. However, there are times when some players may place their index finger 48 in the third valve slide ring 46 as shown in FIG. 5. In other instances, a player may prefer to actuate the third valve slide 40 with their ring finger 52 or their pinky finger 54. In a single performance, a player may use different fingers 48-54 at different times to actuate the third valve slide 40 via the third valve slide ring 46 based on personal comfort.

For a trumpet of the type illustrated in the figures, the balance axis X typically falls somewhere between the thumb saddle 42 and the third valve slide ring 46. Often, the balance axis will lay on or about the third valve casing 32C, as suggested in FIG. 8. However, this is location is only suggested for exemplary purposes, understanding that the configuration of any instrument 22 will dictate its particular balance axis X location. As previously described, the balance axis X represents the imaginary center of gravity for the instrument 22, such that rotation in a forward or rearward tumbling direction about the balance axis X will approximately achieve the best possible equilibrium.

Musical performances are a form of performance art. In addition to the musical sound produced for the audience, such performances can often include visual aspects, such as body movements of the player(s). A marching band performance, for example, is characterized by complex synchronized body movements of many performers combined with musical sounds. In this context, the visual attributes of a performance can include flamboyant maneuvers of the instrument 22, such as spinning. Because of the bright reflective qualities of most brass wind instruments 22, flamboyant maneuvers of trumpets and other horns are a perennial favorite. When the flamboyant maneuver includes spinning the instrument 22, rotation about or in partnership with its balance axis X gives the player maximum control and enables the fastest possible rotation.

Figure 2:
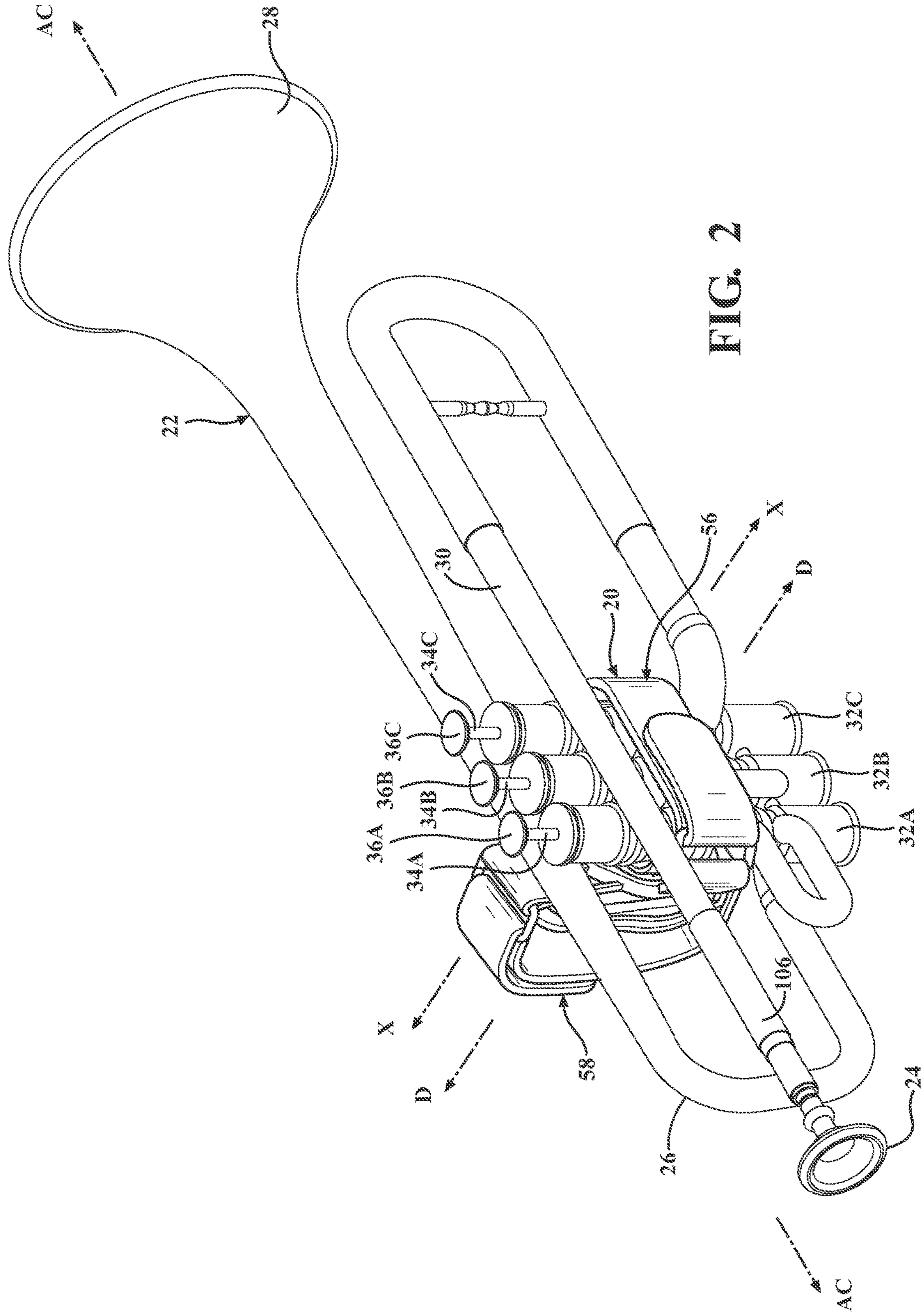
FIG. 2 is a perspective view of a musical instrument, in the form of a trumpet, fitted with a spinner according to an embodiment of this invention.

The musical instrument spinner 20 of this invention enables the player to rotate their instrument 22 about its balance axis X with one conjoined hand LH (or RH, as the case may be) for visual effect, while maintaining full dexterity of the player's conjoined hand LH (or RH) to single-handedly start and stop rotation at will, and to enable the same one hand LH (or RH) to actuate pitch manipulators as may be needed to vary pitch and/or tone. That is to say, the musical instrument spinner 20 of this present invention advantageously empowers the player's conjoined hand LH (or RH) to remain an active and contributing actor in the performance—both visually and audibly. Visually, the spinner 20 enables the conjoined hand LH (or RH) to remain open—thumb 44 and fingers 48-54 extended—while the instrument 22 is spinning, as depicted in FIG. 1. The extended thumb 44 and each extend finger 48-54 is poised to spring to action at any instant starting, stopping, slowing, accelerating and/or reversing rotation of the instrument 22. In addition, the open grip allows the players conjoined hand LH (or RH) to be positioned laterally close to the axial centerline AC of the trumpet (FIGS. 2 and 9), thus minimizing torsional imbalances to yield increased rotational speeds and greater control while the instrument 22 is in spinning motion. Audibly, the spinner 20 enables the thumb 44 and fingers 48-54 of the conjoined hand LH (or RH) to remain useful while the instrument 22 is played, as depicted in FIGS. 4 and 5. As a direct consequence, instruments 22 equipped with mechanical pitch manipulators can be played with full control while the conjoined hand LH (or RH) remains operationally connected to the musical instrument spinner 20. That is to say, when activated for visual arts purposes, the musical instrument spinner 20 enables greater player control over the instrument 22 for accomplishing flamboyant maneuvers. But when dormant for visual arts purposes, the musical instrument spinner 20 enables the conjoined hand LH (or RH) to fully interact with any mechanical pitch manipulators with which the instrument 22 may be equipped.

Figure 7:
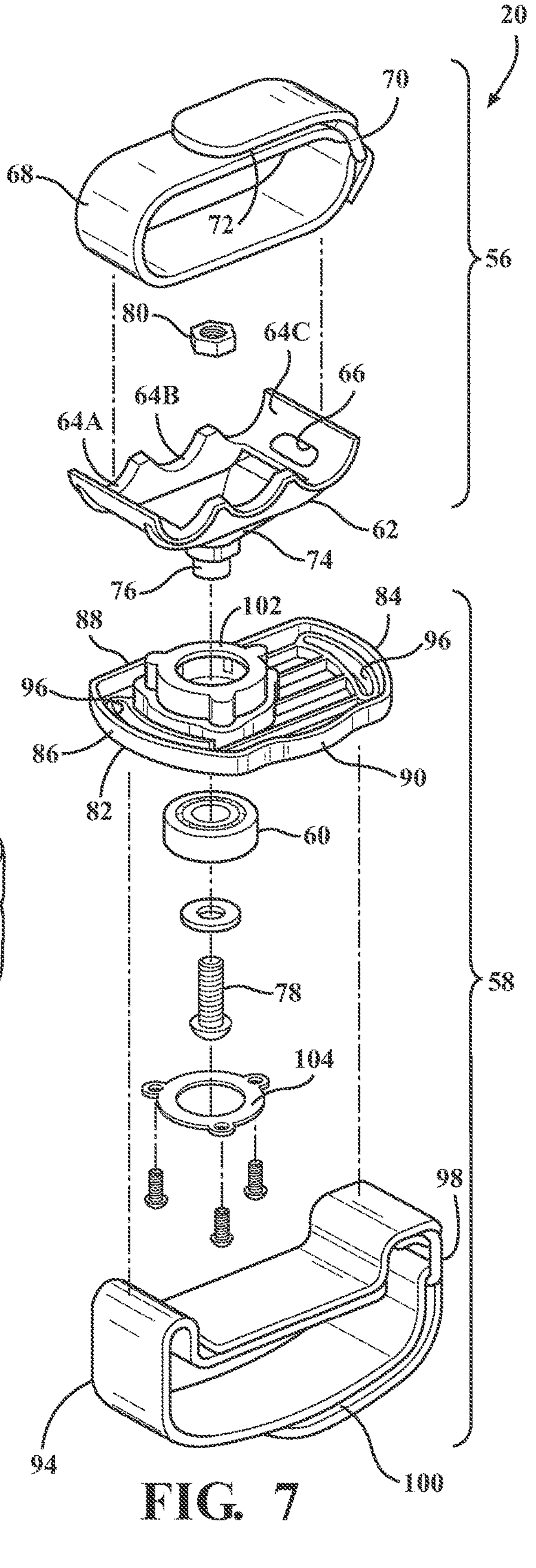
FIG. 7 is an exploded view of the spinner of FIG. 6.

The musical instrument spinner 20 includes a clamp sub-assembly 56 and a hand strap sub-assembly 58, as can be understood by reference to the exploded view of FIG. 7. The clamp sub-assembly 56 configured to attach to the instrument 22 in the vicinity of its balance axis X. For instruments 22 so-equipped, the clamp sub-assembly 56 is preferably located adjacent the one or more mechanical pitch manipulators. The hand strap sub-assembly 58 is configured to encircle the palmar region of a player's conjoined hand LH (or RH, as the case may be).

Figure 9:
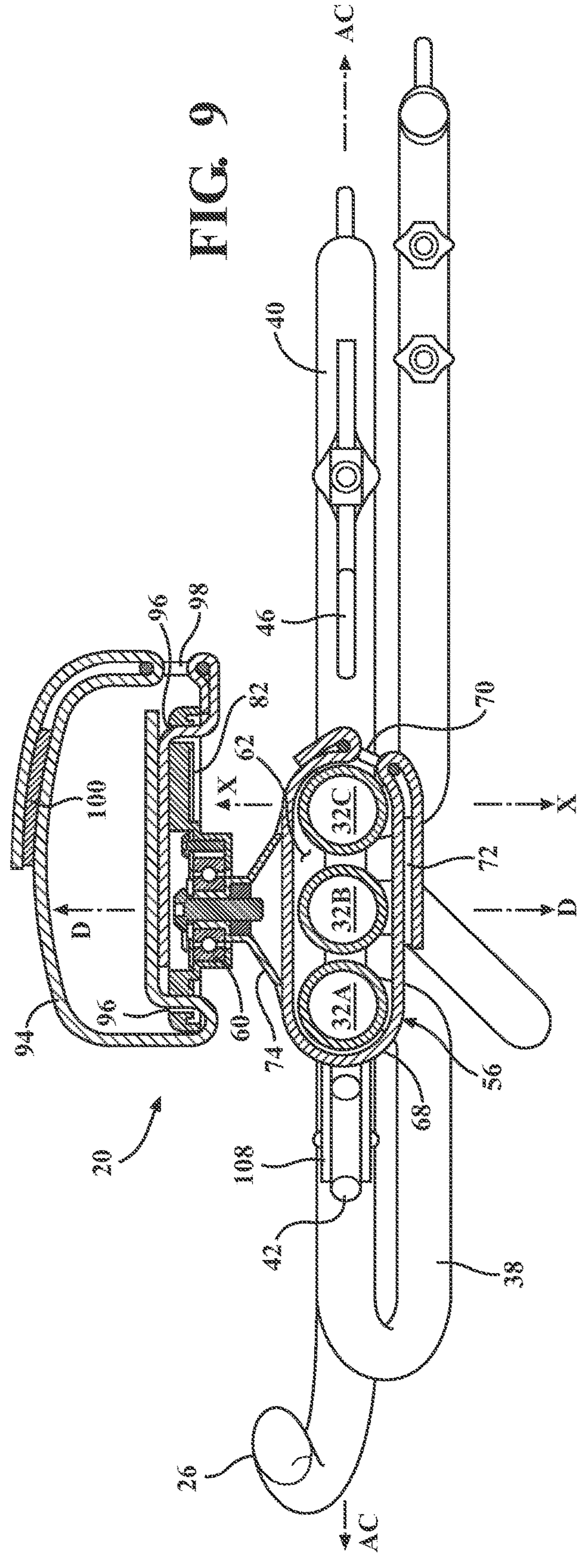
FIG. 9 is a cross-sectional view taken generally along lines 9-9 of FIG. 8.
Figure 11:
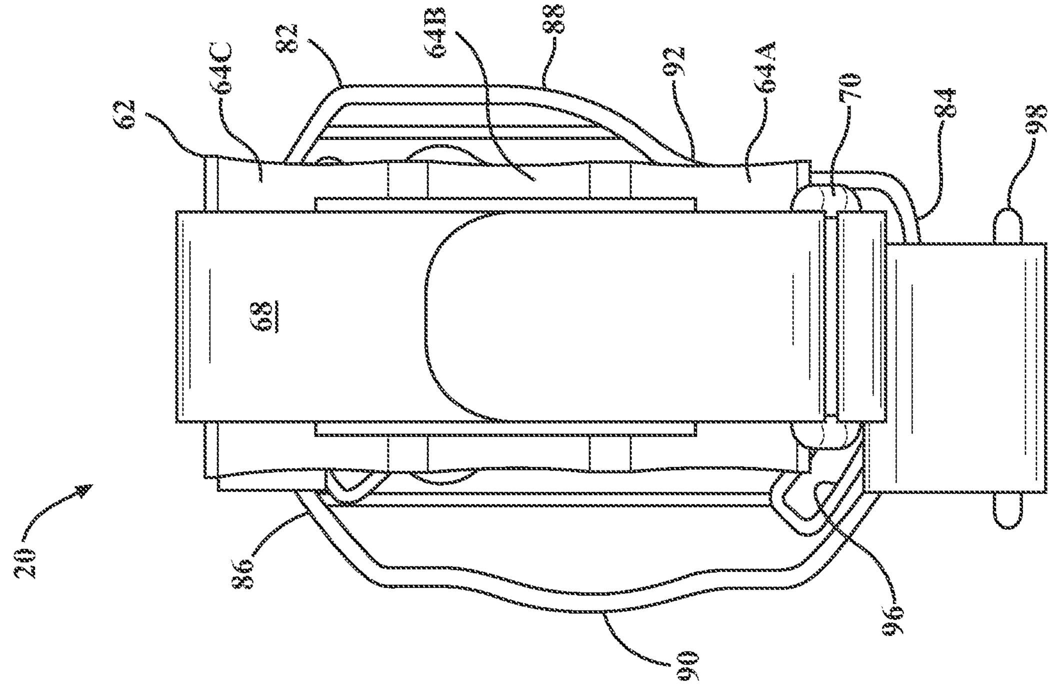
FIG. 11 is a rear view of the spinner of FIG. 6.

A bearing 60 rotatably connects the clamp sub-assembly 56 and the hand strap sub-assembly 58 about a drive axis D. In FIGS. 7 and 9, the bearing 60 is depicted as a roller bearing. Roller style bearings 60 are advantageous for providing low-friction and durability. However, the bearing 60 can take other forms, including also magnetic bearings, plain bearings, bushings and simple journal configurations.

Figure 13:
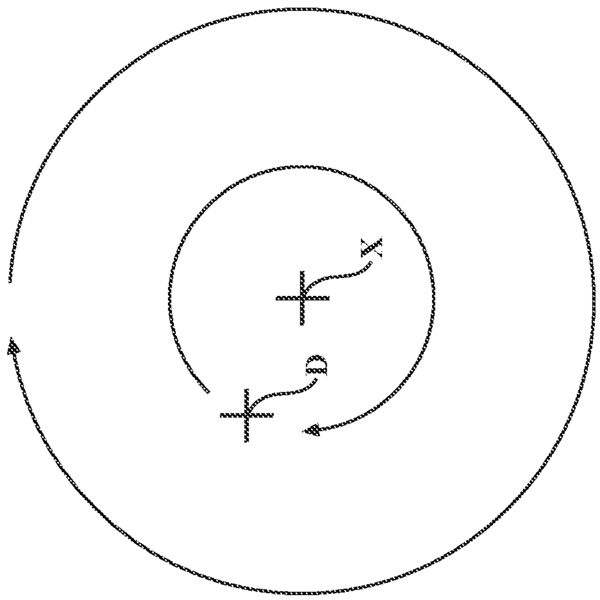
FIG. 13 is a diagram showing that the instrument can be caused to spin about its balance axis (X) by swirling the drive axis (D) in a circle.

When the spinner 20 is installed on the instrument 22, the drive axis D is parallel to its balance axis X. Preferably, the drive axis D and balance axis X are not coincident. That is to say, in the preferred embodiments, there is a lateral offset between the drive axis D and balance axis X to enable a cranking action capable of propelling rotatory motion of the instrument 22. This cranking action is best understood by reference to FIGS. 1 and 13. The player can cause the instrument 22 to spin about its balance axis X, as well as accelerate and decelerate such spinning action, by swirling their conjoined hand LH (or RH) in a circle around the balance axis X. If the diameter of the circular pattern is exactly twice the lateral offset distance between the drive axis D and balance axis X, the instrument 22 will spin in a perfect circle. Most players will be able to naturally sense when their driving hand circles are the correct diameter because the haptic feedback of the rotating instrument will feel at optimal balance. In this manner, the player can emulate the performance of a baton twirler by shifting their conjoined hand LH (or RH) up and out and down and around all the while driving small circles to keep the instrument spinning in visually interesting ways. While FIG. 1 suggests a player making driving hand circles in a vertical plane which causes the instrument 22 to spin upright like a buzzsaw, it will be appreciated that the player's driving hand circles could be motioned in a horizontal plane to cause the instrument 22 to spin flat like a record turntable. Indeed, any driving hand circles made by the player in any plane will cause the instrument to spin in a parallel plane, thus enabling the player unlimited performance opportunities.

Although this beneficial cranking action (FIG. 1) can be accomplished with any lateral offset between drive axis D and balance axis X, there are certain advantages to be gained when the offset is in a forward or rearward direction. I.e., toward the mouthpiece 24 or bell 28, as opposed to an offset in an upward or downward direction. When the lateral offset between drive axis D and balance axis X is in a forward or rearward direction, the moment the player releases his or her grip the instrument 22 will automatically begin to rotate. This is seen as a beneficial initiation of the rotation performance that can be facilitated without any overt player effort other than letting go of the instrument 22. In the example of a trumpet, the spatial relationship between the drive axis D and balance axis X can be seen in FIGS. 2, 8 and 9.

Figure 14:
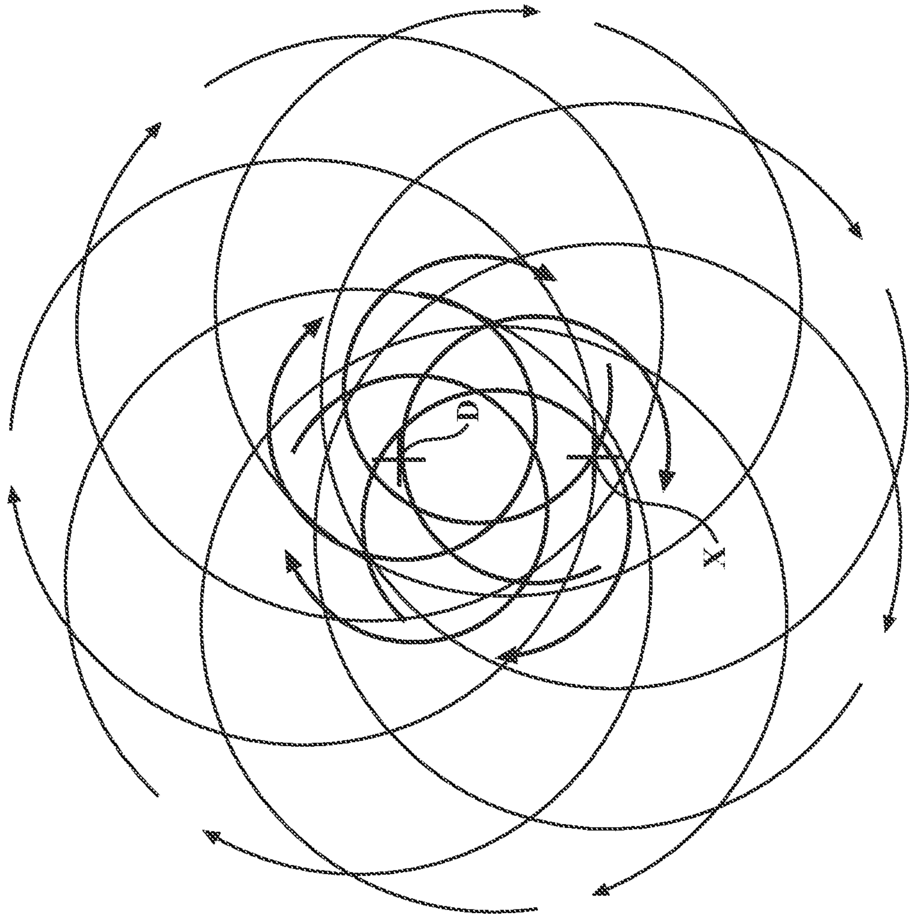
FIG. 14 is intended to graphically explain that complex motions can be achieved by skilled players by, for example, shifting the drive axis (D) back and forth or in an eccentric pattern.

FIG. 14 is intended to graphically explain that more motions more complex that circles can be achieved by skilled players. For example, by shifting the constrained hand back and forth or in an eccentric pattern, the motion of the instrument 22 can become complex. Eccentric patterns can be initiated and maintained through player manipulation of the driving hand circles made with their constrained hand, thus expanding the type of visually interesting performance opportunities that can be achieved with use of the spinner 20.

As previously mentioned, the spinner 20 is suitable for use with a wide variety of different types of instruments 22. In some applications, the spinner 20 will be configured to use the players right hand RH as the conjoined hand through which the driving hand circles are made to control rotation of the instrument. In other applications, the spinner 20 will be configured to use the players left hand LH as the conjoined hand. In the exemplary embodiments, the instrument 22 is illustrated in the form of a trumpet, which is best suited to enlist the player's left hand LH as the conjoined hand. For this reason, references to the conjoined hand henceforth will be presume the player's left hand LH. Indeed, the spinner 20 described in the accompanying examples is readily adaptable to all types of horns having first 32A, second 32B and third 32C valve casings arranged in side-by-side parallel relationship to one another, including but not limited to coronets, mellophones, flugelhorns, French horns, tubas, and the like. However, it must be understood that the spinner 20 is not limited to applications where the instrument 22 possesses three parallel, side-by-side valve casings, nor where the conjoined hand must be the player's left hand LH.

Turning now to FIGS. 6-11, the clamp sub-assembly 56 and hand strap sub-assembly 58 will be described in greater detail, according to an exemplary embodiment of the invention. The design features mentioned below are suited to embodiments where the instrument 22 is a trumpet (or coronet, mellophone, flugelhorn, etc.), and in which the conjoined hand is the player's left hand LH. Those of skill in the art will appreciate that many variations and adaptations of the disclosed design features are possible without departing from the spirit of this invention, particularly as they may be modified to suit instruments 22 other than trumpets.

The clamp sub-assembly 56 includes a mounting plate 62. The purpose of the mounting plate is to make a secure fit to a relevant portion of the instrument 22. In most cases, the relevant portion of the instrument 22 will be at some mid-region of the sound tube 26. Naturally, the mounting plate 62 will be configured to match the particular instrument 22 to which it is intended to couple. That is to say, the mounting plate 62 for a flute will be shaped differently than the mounting plate 62 for a saxophone. In the case of brass wind instruments 22 having three central finger-actuated valves, like trumpets, coronets, mellophones and flugelhorns, to name but a few, the mounting plate 62 may include a first cradle 64A, a second cradle 64B and a third cradle 64C. Each cradle 64A-C is cupped or dished to nest against the side of the respective first 32A, second 32B and third 32C valve casings. As perhaps best shown in the cross-section of FIG. 9, the contoured shape of the mounting plate 62 fits with mated precision against all three valve casings 32A-C thus efficiently transferring and distributing reaction forces thereacross.

In the illustrated examples, the mounting plate 62 has a pair of apertures 66. One aperture 66 is set in the first cradle 64A and the other the aperture 66 is set in the third cradle 64C. A lashing 68 is operatively connected to the mounting plate 62. The function of the lashing 68 is to press the mounting plate 62 into direct contact with the relevant portion of the instrument 22. In the example of a trumpet, the lashing 68 presses the first cradle 64A in direct engagement with the first valve casing 32A, and the second cradle 64B in direct engagement with the second valve casing 32B, and the third cradle 64C in direct engagement with the third valve casing 32C.

Figure 8:
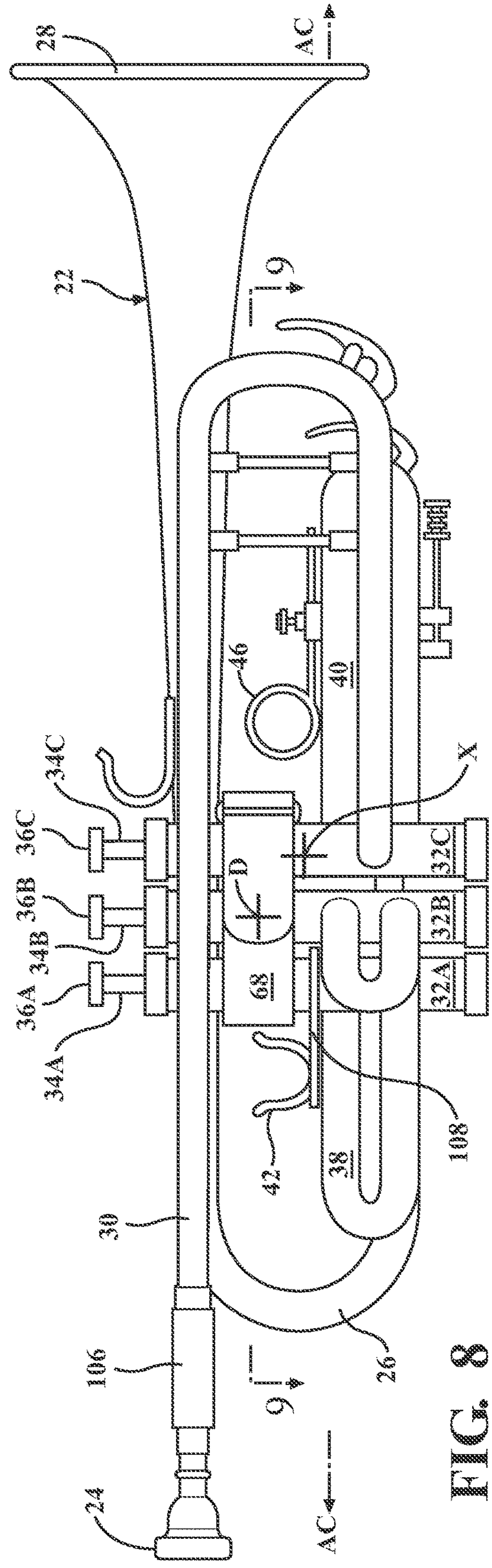
FIG. 8 is a right side view of the trumpet of FIG. 2.

As can be seen clearly in FIGS. 5 and 8, from a vertical perspective the lashing 68 together with the mounting plate 62 are disposed in the natural clearance below the lead pipe 30 section of the sound tube 26 and above each of the first valve tuning slide 38 and the third valve slide 40. This location places the lashing 68 and the mounting plate 62 strategically between the thumb saddle 42 and the third valve slide ring 46.

The lashing 68 may be connected to the mounting plate 62 by any suitable manner. Throughout FIGS. 1-11 the clamp sub-assembly 56 is shown with lashing 68 in the form of a flexible, strap-like member that has been threaded through each of the apertures 66 in the mounting plate 62 to form a constricting loop. The lashing 68 includes a buckle 70 and also a hook and loop fasteners 72 disposed to engage one another on opposite sides of the buckle 70. In this manner, the lashing 68 can be cinched tight to securely attach the mounting plate 62 to the instrument 22.

Figure 15:
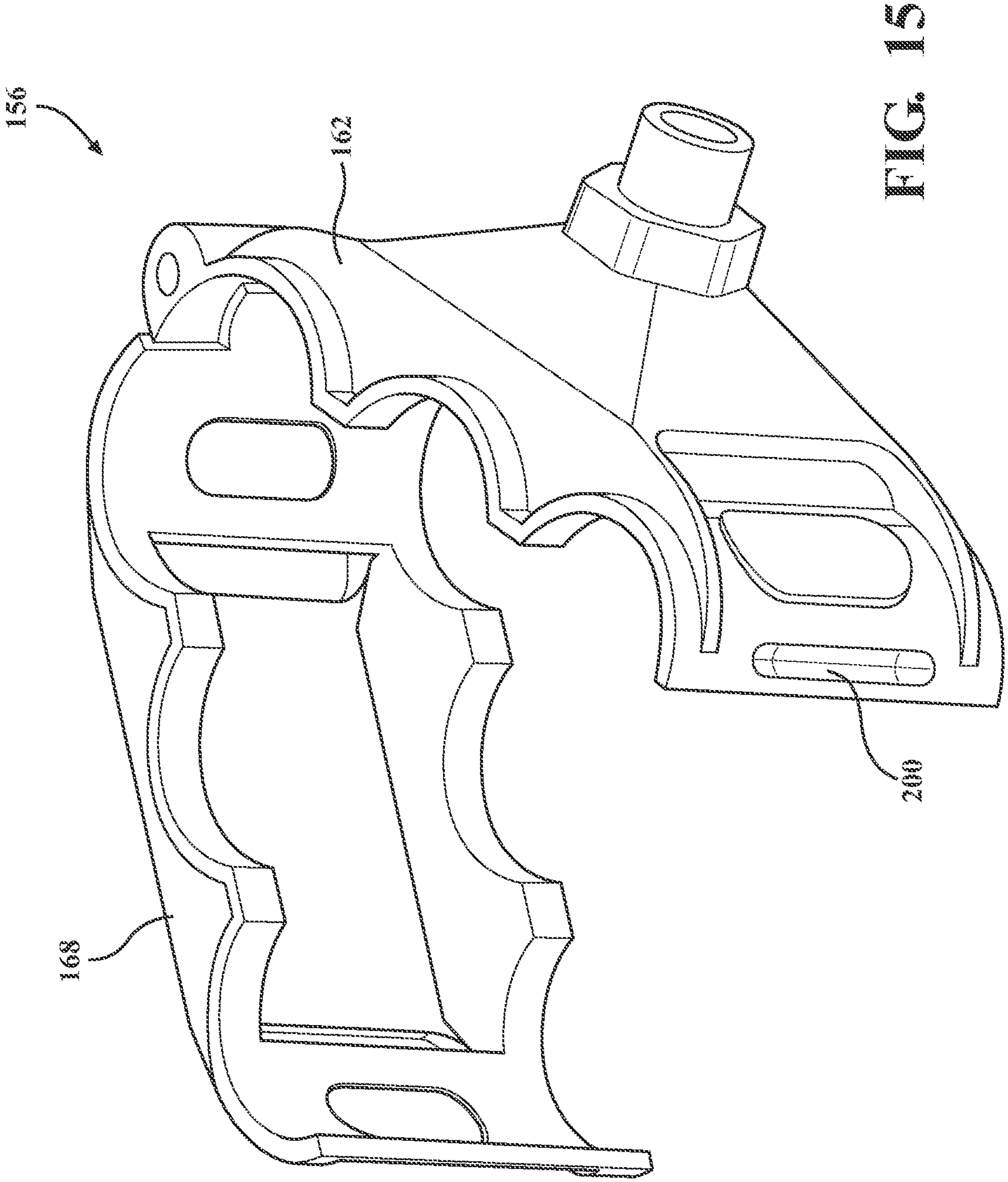
FIG. 15 is a perspective view of an alternative embodiment of the clamp sub-assembly.

However, those of skill in the art will appreciate number alternative designs, such as the embodiment shown in FIG. 15. In this example, the clamp sub-assembly 156 is shown with a rigid lashing 168 having scalloped, cradle-like sections similar to the mounting plate 162. The rigid lashing 168 is hingedly connected to the mounting plate 162 to enable a clam-shell like connection to the valve casings 32A-C. A clasp 200 is located to the free ends of the mounting plate 162 and rigid lashing 168 to secure the hinged member together for use. Of course, the clamp sub-assembly 156 shown in FIG. 15 is but one of many possible alternative configurations.

Returning to FIGS. 7-11, the clamp sub-assembly 56 is shown including a stand-off 74. The purpose of the stand-off 74 is to create clearance between the player's conjoined hand LH and the instrument 22 so that the extended thumb 44 and fingers 48-54 will not make contact as the instrument 22 spins. The stand-off 74 is preferably no taller than necessary to provide adequate space for spinning. The drive axis D passes through the stand-off 74. At the distal end of the stand-off 74 is a journal 76 centered on the drive axis D. The journal 76 may be formed as a hollow, tube-like feature so as to receive a retainer screw 78. Furthermore, in the examples shown, the stand-off 74 is hollow and accommodates a nut pocket behind the journal 76. In this manner, the retainer screw 78 passing through the journal 76 will be disposed to engage a nut 80 seated in the nut pocket.

The hand strap sub-assembly 58 includes a generally rigid palm plate 82, which may perhaps best be viewed in FIGS. 6, 7, 10 and 12. The palm plate 82 is intended to fit comfortably within the palmar region of the conjoined hand LH. In some contemplated embodiments, the palm plate 82 may have a wheel-like shape suggestive of a water bib faucet handle. In other contemplated embodiments, the palm plate 82 may have an elliptical, oval or football shape. Many variations are possible. Ideally, the palm plate 82 will be shaped to accommodate the associated instrument 22 to which is it coupled.

Figure 3:
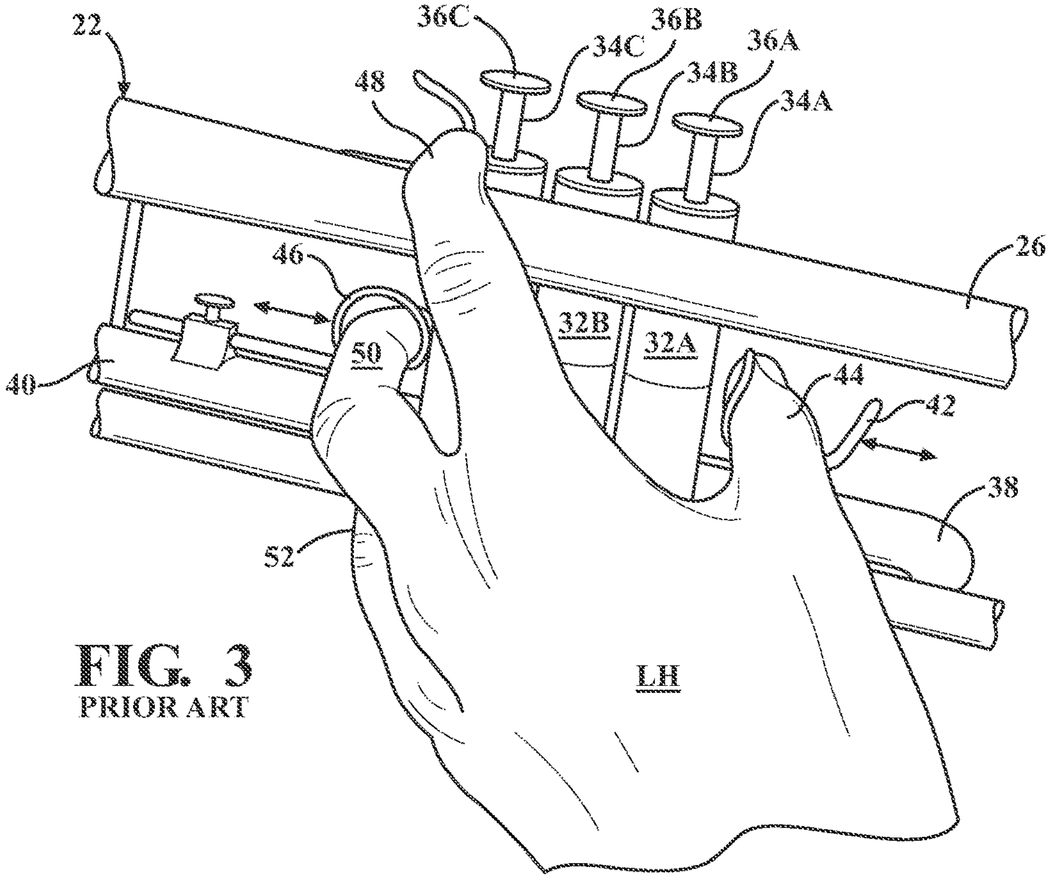
FIG. 3 PRIOR ART
FIG. 3 is a close-up view of a player holding a prior art trumpet with their left hand.
Figure 12:
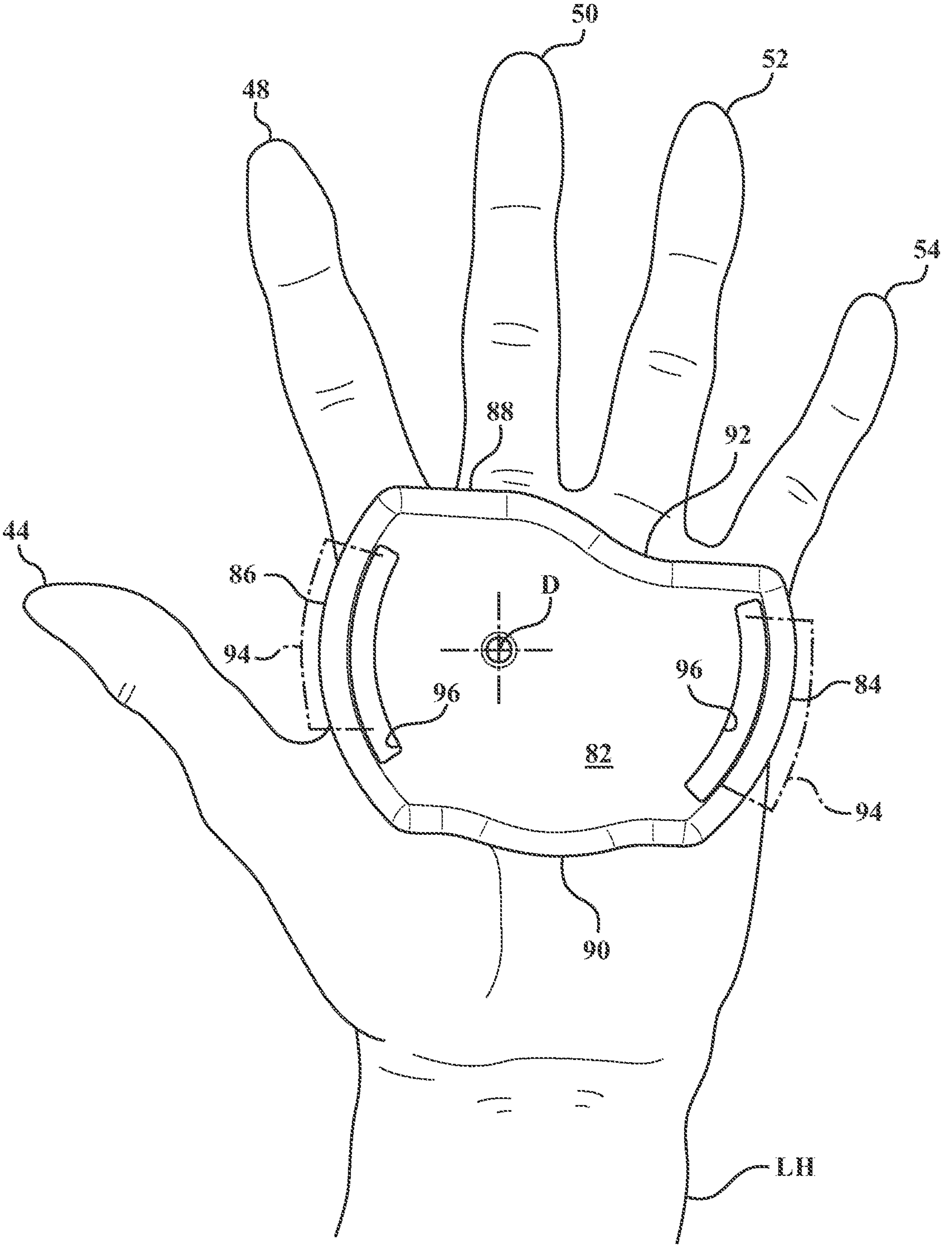
FIG. 12 is a simplified view showing the positioning of the palm plate within the player's conjoined hand.

In the trumpet-specific embodiment shown in the drawings, the palm plate 82 is strategically shaped to provide optimal dexterity and comfort during both spinning mode and playing mode. In particular, the shape of the palm plate 82 is designed to locate the drive axis D in the palmer region of the conjoined hand LH, generally in line with the player's middle finger 50, as shown in FIG. 12. By positioning the drive axis D in the palmer region of the conjoined hand LH, generally in line with the player's middle finger 50, the grip during playing mode (FIG. 4) stations the thumb 44 and fingers 48-54 in comfortable and natural reach of the portions of the sound tube 26 and mechanical pitch manipulators as would be accustomed from usage of a prior art trumpet (FIG. 3).

By reference to FIG. 12, the plan view shape of the palm plate 82 can be defined as generally rectangular body having a mostly flat, or plate-like, configuration. In particular, the palm plate 82 has a hypothenar end 84 corresponding to the hypothenar region of the conjoined hand LH, and a web end 86 corresponding to the web region or first interdigital space of the conjoined hand LH. In FIG. 12, the hypothenar end 84 is seen as the left side and the web end 86 as the right side of the palm plate 82. The driver axis D is located relatively closer to the web end 86 and relatively farther from the hypothenar end 84. The hypothenar 84 and web 86 ends may be gently rounded for comfort. Again from the perspective of FIG. 12, the top of palm plate 82 can be defined as a distal edge 88 and the bottom a proximal edge 90. The distal edge 88 is designed to reside just under the each of the finger 48-54. That is to say, the distal edge 88 is contained generally on the palmar region of the conjoined hand LH, but positioned close to the fingers 48-54.

The distal edge 88 may be fitted with a ring finger relief 92 adjacent the hypothenar end 84. The ring finger relief 92 comprises a concavity, or dip, in the otherwise gently curving contour of the distal edge 88. As the name might suggest, the ring finger relief 92 enables a slightly greater degree of dexterity to the ring finger 52, such as may be appreciated when manipulating the third valve slide 40 (FIG. 3). For most people, the ring finger 52 possess less strength than the middle finger 50, such that a modest relative increase in dexterity may be welcome. Furthermore, the ring finger relief 92 provides an asymmetrical discontinuity in the distal edge 88. Naturally, a player will develop a haptic sense for the position of the palm plate 82 in their conjoined hand LH by sensing location of the ring finger relief 92. And still further, the discontinuity of the ring finger relief 92 provides added grip security, especially when handling the instrument single-handedly.

The proximal edge 90, by contrast, may have a more symmetrical shape to comfortably interact with the fleshy thenar region of the palm. In the illustrated example of FIG. 12, the proximal edge 90 has a generally convex curvature.

A belt 94 is coupled to the palm plate 82 for the purpose of cinching or strapping to the conjoined hand LH. The belt 94 is a flexible strap-like member designed to extend over the dorsal side of the conjoined hand LH. The belt 94 may be connected to the palm plate 82 by any suitable manner. The figures illustrate the belt 94 as being threaded through the pair of arcuate slots 96 in the palm plate 82. One slot 96 is adjacent the hypothenar end 84 and the other the slot 96 adjacent the web end 86. The belt 94 could, in some contemplated examples, be an elastic loop or even a glove. But in the illustrated examples, the belt 94 is a relatively narrow, non-elastic, strip-like member that can be tightened over the conjoined hand LH by doubling back through a clasp 98 and then securing in a tightened condition with hook and loop fasteners 100.

The shape of the palm plate 82 and the manner in which the palm plate 82 is secured to the conjoined hand LH enables the player to maintain full, or nearly full, dexterity of the thumb 44 and fingers 48-54 of the constrained hand. This can best be appreciated by comparing FIGS. 3 and 4. With fully dexterous digits 44, 48-54, the player is empowered to interact with the instrument 22 for both playing (sound performance) and spinning (visual performance). moreover, during spinning mode the player's conjoined hand LH can remain open, thumb 44 and fingers 48-46 extended, as shown in FIG. 1 (and FIG. 12). Extended thumb 44 and fingers 48-46 has several benefits. For one, the sensitive knuckles of conjoined hand LH are protected from painful spin strikes by the fleshy and flexible digits. For another, this places the palm of the conjoined hand LH closer (laterally) to the axial center AC of the instrument 22, thus minimizing torsional distresses.

Furthermore, the wide, generally flat palm plate 82 distributes reaction forces across the entire palmar region that resist torque-induced precession created by the spinning instrument 22. As is generally know, precession is a term used in physics to describe the change in the orientation of the rotational axis of a rotating body. One type of precession is known as torque-induced precession, or gyroscopic precession, a phenomenon commonly seen in a spinning toy top. If the speed of the rotation and the magnitude of the external torque are constant, the spin axis will move at right angles to the direction that would intuitively result from an external torque. In the case of a spinning instrument 22, the player's conjoined hand LH must counteract this torque-induced precession to resist a natural urge of the spinning instrument 22 to pitch and roll. However, because the conjoined hand LH assumes an open (fingers extended) condition when the instrument 22 is in spinning motion (see FIG. 1), the resistance to torque-induced precession cannot be assisted in any way by the player's grasping thumb 44 and fingers 48-54. The generous, planar palm plate 82 utilizes a majority of the palmar region of the conjoined hand LH with which to distribute the reaction to these torsional forces, thus enabling the player to maintain the instrument 22 spinning rapidly for prolonged periods without the appearance of torque-induced precession nor the onset of fatigue caused thereby.

Figure 10:
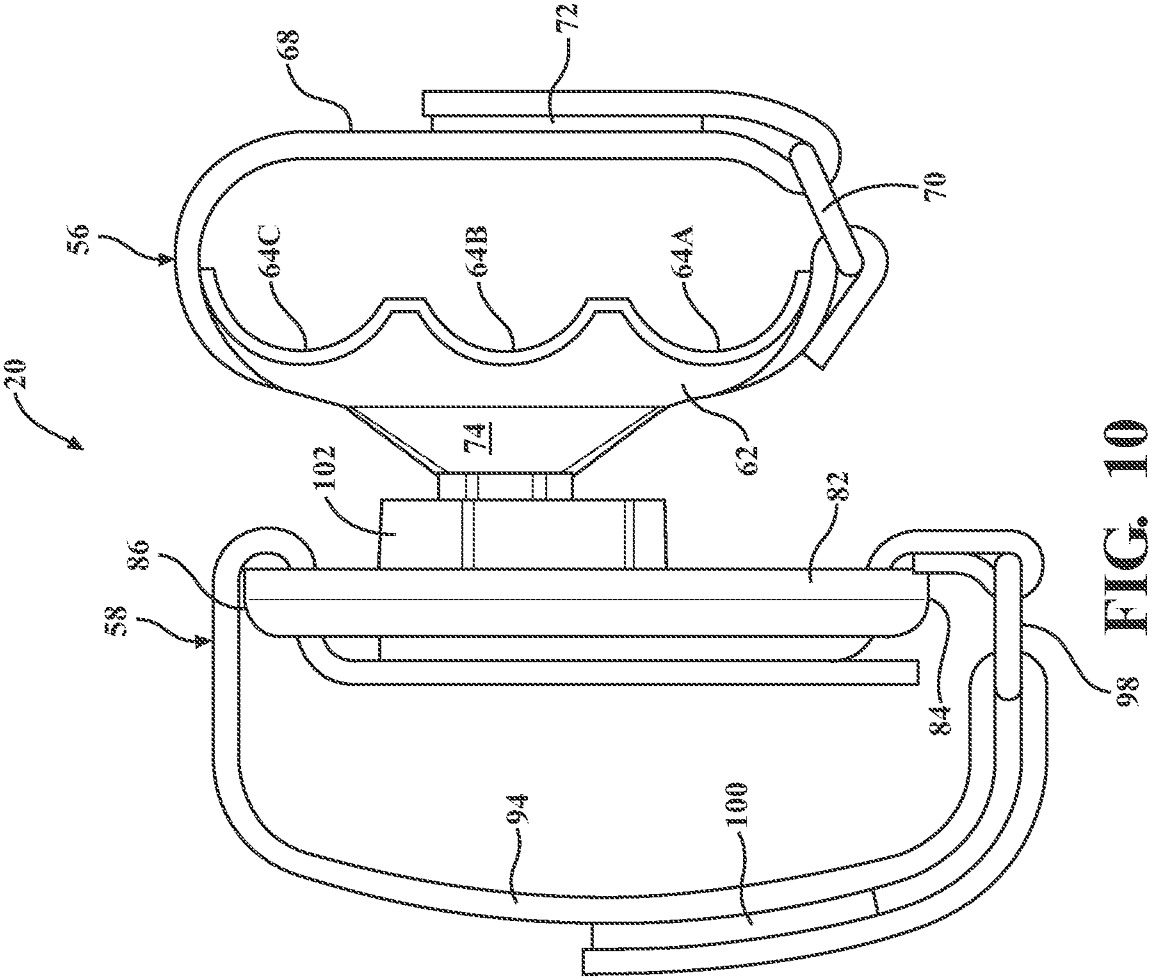
FIG. 10 is a side elevation view of the spinner of FIG. 6.

FIGS. 7, 9 and 10 show a driver boss 102 affixed to the backside of the palm plate 82, i.e., opposite the side against which the player's conjoined hand LH is in contact. The drive axis D passes through the driver boss 102, and in this manner the driver boss 102 is located proximate the web end 86 and distant from the hypothenar end 84. As previously explained, this asymmetric positioning is to locate the drive axis D below middle finger 50 of the conjoined hand LH. The driver boss 102 includes a bearing cup concentrically aligned with respect to the drive axis D and the journal 76, and into which the bearing 60 is operatively seated. Thus, the bearing 60 operatively interconnects the bearing cup and the journal 76 for relative rotation about the drive axis D. Of course, there are many different ways to configure the rotational interface between the clamp sub-assembly 56 and hand strap sub-assembly 58. For example, the journal 76 could be re-configured as an element of the hand strap sub-assembly 58 and the bearing cup as an element of the clamp sub-assembly 56.

Because the conjoined hand LH remains fully dexterous during all phases of use, it is considered unnecessary to incorporate a braking mechanism into the rotational interface. If desired, however, a friction braking feature could be incorporated into the assembly 20 to retard or arrest spinning action of the instrument 22. For example, such a braking mechanism could be activated by a simple depressible button or lever carried on the palm plate 82 (not shown). By depressing the button, frictional engagement is made with the journal 76 or some other suitable component associated with the clamp subassembly 56.

Because the spinner 20 of this invention enables the player to generate high rotational speeds for prolonged periods of time, certain accessory features may be desirable. This include an elastic splint 104 and a slide tether 106, both depicted in FIG. 8. The elastic splint 104 can be formed from a short piece of surgical tubing and placed to bridge the interface between mouthpiece 24 and lead pipe 30. With a sufficiently tight frictional grip, the elastic splint 104 can prevent the mouthpiece from being launched during a high-speed spin due to centrifugal force. Similarity, the tether 106 can be a piece of string or elastic band, like a hair tie, that is looped around the first valve casing 32C and the thumb saddle 42. These and other strategies can be implemented, as needed, to guard against mishaps provoked by high-speed rotation of the instrument 22.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A musical instrument spinner assembly comprising:

a clamp sub-assembly configured to attach to a wind instrument, said clamp sub-assembly including a mounting plate, a lashing operatively connected to said mounting plate, said clamp sub-assembly including a stand-off, a drive axis passing through said stand-off, a hand strap sub-assembly configured to encircle the palmar region of a conjoined hand, a bearing rotatably connecting said clamp sub-assembly and said hand strap sub-assembly about said drive axis, wherein the improvement comprises said hand strap sub-assembly including a generally rigid palm plate, and a belt coupled to said palm plate.

2. The assembly of claim 1, wherein said palm plate includes a hypothenar end and a web end and a distal edge and a proximal edge, said distal edge having a ring finger relief adjacent said hypothenar end.

3. The assembly of claim 2, wherein said ring finger relief comprising a concavity.

4. The assembly of claim 2, wherein said proximal edge having a generally convex curvature.

5. The assembly of claim 2, further including a driver boss affixed to said palm plate, said drive axis passing through said driver boss, said driver boss located adjacent said web end and spaced from said hypothenar end.

6. The assembly of claim 5, further including a journal extending from said stand-off and centered along said drive axis, said journal being hollow along said drive axis, a nut pocket disposed in said stand-off, said driver boss including a bearing cup, said bearing cup concentrically aligned with respect to said drive axis of said journal.

7. The assembly of claim 2, wherein said palm plate includes a pair of slots, one said slot adjacent said hypothenar end and the other said slot adjacent said web end, said belt threaded through said pair of slots in said palm plate, said belt being flexible, said belt including a clasp, said belt including a hook and loop fastener disposed to engage adjacent said clasp.

8. The assembly of claim 1, wherein said mounting plate includes a first cradle and a second cradle and a third cradle.

9. The assembly of claim 8, wherein said lashing is flexible, said lashing including a buckle, said lashing including a hook and loop fastener.

10. The assembly of claim 1, further including a journal extending from said stand-off and centered along said drive axis, wherein said bearing comprises a roller bearing operatively connected to said journal for relative rotation about said drive axis, a retainer screw disposed through said bearing and said journal, said retainer screw engaging a nut disposed in said stand-off.

11. A spinner assembly for a musical instrument of the horn type having first and second and third valve casings arranged in side-by-side parallel relationship to one another, said assembly comprising:

a clamp sub-assembly configured to attach to the valve casings of the instrument, said clamp sub-assembly including a mounting plate, said mounting plate including a first cradle and a second cradle and a third cradle, a lashing operatively connected to said mounting plate, said clamp sub-assembly including a stand-off, a drive axis passing through said stand-off, a hand strap sub-assembly configured to encircle the palmar region of a conjoined hand, a bearing rotatably connecting said clamp sub-assembly and said hand strap sub-assembly about said drive axis, wherein the improvement comprises said hand strap sub-assembly including a generally rigid palm plate, said palm plate having a hypothenar end and a web end and a distal edge and a proximal edge, a belt coupled to said palm plate, a driver boss affixed to said palm plate, said drive axis passing through said driver boss, said driver boss located adjacent said web end and spaced from said hypothenar end.

12. The assembly of claim 11, wherein said distal edge of said palm plate includes a ring finger relief adjacent said hypothenar end.

13. The assembly of claim 12, wherein said ring finger relief comprising a concavity.

14. The assembly of claim 11, wherein said proximal edge of said palm plate has a generally convex curvature.

15. The assembly of claim 11, wherein said palm plate includes a pair of slots, one said slot adjacent said hypothenar end and the other said slot adjacent said web end, said belt threaded through said pair of slots in said palm plate, said belt being flexible, said belt including a clasp, said belt including a hook and loop fastener disposed to engage adjacent said clasp.

16. The assembly of claim 11, wherein said mounting plate has a pair of apertures, one said aperture adjacent said first cradle and the other said aperture adjacent said third cradle, said lashing being flexible, said lashing threaded through each of said apertures of said mounting plate.

17. The assembly of claim 11, further including a journal extending from said stand-off and centered along said drive axis, said journal being hollow along said drive axis, a nut pocket disposed in said stand-off, said driver boss including a bearing cup, said bearing cup concentrically aligned with respect to said drive axis of said journal.

18. The assembly of claim 17, wherein said bearing is disposed in said bearing cup and operatively connected to said journal for relative rotation about said drive axis, a retainer screw disposed through said bearing and said journal, said retainer screw engaging a nut disposed in said nut pocket of said stand-off.

19. A combination musical instrument of the horn type and spinner assembly comprising:

a wind instrument having a mouthpiece for air input and a bell for air escape, said wind instrument having optimal rotational balance about a balance axis disposed generally midway between said mouthpiece and said bell, a sound tube plenum extending between said mouthpiece and said bell, said sound tube including a lead pipe section adjoining said mouthpiece, a first valve casing and a second valve casing and a third valve casing, said first and second and third valve casings arranged parallel to one another, said first and second and third valve casings arranged generally perpendicular to said lead pipe section, said first valve casing adjacent said mouthpiece and said third valve casing adjacent said bell, a first valve stem extending from said first valve casing and disposed for reciprocating movement therein, a first finger button affixed to a distal end of said first valve stem, a second valve stem extending from said second valve casing and disposed for reciprocating movement therein, a second finger button affixed to a distal end of said second valve stem, a third valve stem extending from said third valve casing and disposed for reciprocating movement therein, a third finger button affixed to a distal end of said third valve stem, a clamp sub-assembly attached to said wind instrument, said clamp sub-assembly including a mounting plate, said mounting plate including a first cradle and a second cradle and a third cradle, a lashing operatively connected to said mounting plate, said lashing pressing said first cradle in direct engagement with said first valve casing and said second cradle in direct engagement with said second valve casing and said third cradle in direct engagement with said third valve casing, said lashing disposed below said lead pipe section of said sound tube, said clamp sub-assembly including a stand-off, a drive axis passing through said stand-off, a hand strap sub-assembly configured to encircle the palmar region of a conjoined hand, said hand strap sub-assembly including a generally rigid palm plate, said palm plate having a hypothenar end and a web end, said palm plate having a distal edge and a proximal edge, a driver boss affixed to said palm plate, said drive axis passing through said driver boss, said driver boss located adjacent said web end and spaced from said hypothenar end, a belt coupled to said palm plate, said belt being flexible, a bearing rotatably connecting said clamp sub-assembly and said hand strap sub-assembly about said drive axis.

20. The assembly of claim 19, wherein said distal edge having a ring finger relief adjacent said hypothenar end, said ring finger relief comprising a concavity.

* * * * *